United States Patent [19]
Kornis et al.

[11] 3,907,888
[45] Sept. 23, 1975

[54] M-PHENYLUREA AND PHENYLTHIOUREA OXIME DERIVATIVES

[75] Inventors: Gabriel Kornis; Eldon G. Nidy, both of Kalamazoo, Mich.

[73] Assignee: The Upjohn Company, Kalamazoo, Mich.

[22] Filed: May 29, 1973

[21] Appl. No.: 364,824

Related U.S. Application Data

[62] Division of Ser. No. 145,016, May 19, 1971, Pat. No. 3,778,473.

[52] U.S. Cl. .............................................. 260/553 A
[51] Int. Cl. ........................................... C07c 127/00
[58] Field of Search ................................. 260/553 A

[56] References Cited
OTHER PUBLICATIONS

Auwers et al., Chemical Abstracts, Vol. 21, pp. 1118–1119 (1927).

*Primary Examiner*—Howard T. Mars
*Assistant Examiner*—G. Breitenstein
*Attorney, Agent, or Firm*—Willard L. Cheesman

[57] ABSTRACT

A number of new m-aminobenzaldoxime derivatives have been found to possess herbicidal and plant growth regulator activity. The amine grouping has been converted into an urea, thiourea, carbamate or thiocarbamate function, and the oxime group has been converted by the formation of O-ethers.

3 Claims, No Drawings

M-PHENYLUREA AND PHENYLTHIOUREA OXIME DERIVATIVES

CROSS REFERENCE TO RELATED APPLICATIONS

This application is a division of application Ser. No. 145,016, filed May 19, 1971 and now U.S. Pat. No. 3,778,473, issued Dec. 11, 1973.

SUMMARY OF THE INVENTION

This invention pertains to new organic compounds, to a process for preparing the same, to a new method for controlling weeds, and to new herbicidal compositions. The invention is more particularly directed to new benzaldoxime-m-urea and benzaldoxime-m-carbamate derivatives; to a new process for preparing the same, particularly lower alkyl and aryl derivatives; to a new method of controlling weeds with the benzaldoxime urea and benzaldoxime carbamates of this invention; and to new herbicidal compositions containing the same.

The new m-aminobenzaldoxime compounds of this invention have the general structural formula:

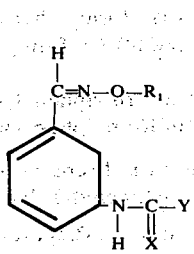

where:
R$_1$ = H or nitrophenyl.
X = O or S,

Y=N$\begin{smallmatrix}R_2,\\R_3\end{smallmatrix}$ or OR$_3$,

R$_2$ = H or R$_3$,
R$_3$ = alkyl of from 1 to 8 carbon atoms, inclusive, alkenyl of from 3 to 8 carbon atoms, inclusive, aralkyl of from 7 to 13 carbon atoms, inclusive, aryl of from 6 to 10 carbon atoms, inclusive (provided both R$_1$ and R$_2$ are not aryl at the same time).

The m-aminobenzaldehyde oxime, used as a starting material can be made by known methods. For practical reasons, we have prepared it be reacting hydroxylamine, as the hydrohalide salt, with polymeric m-aminobenzaldehyde as is illustrated in the Preparation below.

Treatment of m-aminobenzaldehyde oxime of Formula II with an isocyanate or isothiocyanate yields disubstituted ureas or thioureas of Formula I where X is oxygen or sulphur and Y is NHR$_3$, R$_1$ and R$_3$ having the meaning described previously.

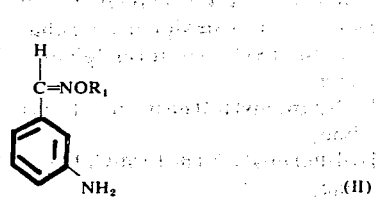

The reaction is carried out in an organic solvent, preferably in the presence of a catalytic amount of a tertiary organic base such as a trialkylamine. The reaction produce can be recovered from the reaction mixture, usually by filtration, and it can be purified by recrystallization. Other methods such as extraction or chromatographic separation can also be used to recover and to purify the products.

Trisubstituted ureas and thioureas of formula I where

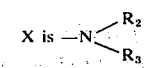

and R$_2$ is not hydrogen, but otherwise R$_1$, R$_2$ and R$_3$ are as previously described, are prepared by reacting compound II with a disubstituted carbamoyl or thiocarbamoyl halide in the presence of an organic base, such as pyridine.

The reaction is preferably carried out in a basic organic solvent, such as pyridine and the carbamoyl halide added to the cooled reaction medium. The product can be recovered from the reaction mixture by extraction, evaporation or any other suitable method as will occur to those skilled in the art.

The compounds of Formula I where Y is —OR$_3$ as defined above, can be prepared by reacting compound II with a haloformic acid ester as follows:

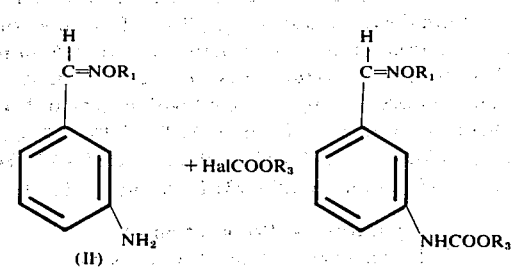

The reaction is carried out in a mildly basic reaction medium. At the end of the reaction, the mixture is treated with aqueous acid, and the product can be recovered by extraction from the mixture, evaporation of solvent, and purified by recrystallization.

O-Alkylation of the oxime amine (II; R$_1$=H) is effected by treating the sodium salt of II with an aliphatic or aromatic halide.

The reaction is preferably carried out in an aqueous basic reaction medium from which the substituted oxime usually precipitates and can be recovered by filtration. Other methods of working up the mixture will be apparent to those skilled in the art, for example extraction and evaporation followed by recrystallization.

DESCRIPTION OF THE PREFERRED EMBODIMENTS

Preparation 1: m-Aminobenzaldehyde oxime

To a vigorously stirred suspension of hydroxylamine hydrochloride (22.5 g; 0.325M) and sodium acetate trihydrate (45 g.; 0.33M) in 95% ethanol (100 ml.) a suspension of polymeric m-aminobenzaldehyde (36.3 g.; 0.3 M) in 95% ethanol (300 ml.) was added. The reaction mixture was stirred overnight, filtered, and the filtrate poured onto ice (800 ml.). After two hours, the clear solution was concentrated under reduced pressure at 45° C., and the resultant oil was extracted with hot benzene (3 × 250 ml.). The combined benzene extract was decolorized with charcoal, and on cooling, long silky needles were deposited. M.P. 88°–9° C. Publ. 88° C. Beilstein XIV, 28.

Anal. Calc'd. for $C_7H_9N_2O$ (136.15): C, 61.75; H, 5.92; N, 20.58. Found: C, 61.70; H, 5.60; N, 20.59.

Preparation 2:
m-Aminobenzaldehyde-O-(p-nitrophenyl) oxime

Sodium metal (2.3 g.; 0.1 M) was dissolved in absolute ethanol (80 ml.) and added to a solution of m-aminobenzaldehyde oxime (13.6 g.; 0.1 M). The mixture was heated to boiling, cooled, and treated dropwise with a solution of p-nitrofluorobenzene (14 1 g.; 0.1 M) in absolute ethanol (30 ml.) and kept at 60° C. for 6 hours. The cold reaction mixture was poured onto ice water (800 ml.), the precipitate filtered, dried, and recrystallized from acetone/hexane. M.P. 166°–167° C.

Anal. Calc'd. for $C_{13}H_{11}N_3O_3$ (257.24): C, 60.69; H, 4.31; N, 16.34. Found: C, 60.66; H, 4.66; N, 15.83.

Preparation 3: 1-Methyl-3-(m-formylphenyl)urea oxime

To a chilled solution of m-amino-benzaldehyde oxime (13.6 g.; 0.1 M) in ether (280 ml.). triethylamine (12 drops) was added, followed by the dropwise addition of methyl isocyanate (6.3 g.; 0.11 M) with vigorous stirring. Precipitation commenced within 5 minutes. The reaction mixture was stirred overnight at room temperature, filtered, washed with ether, and recrystallized from acetone/hexane. M.P. 179°–181° C.

Anal. Calc'd. for $C_9H_{11}N_3O_2$ (193.20): C, 55.95; H, 5.74; N, 21.75. Found: C, 55.93; H, 5.54; N, 21.60.

Preparation 4: Preparation of 1-ethyl-3-(m-formylphenyl) urea oxime

Following the procedure of Preparation 3 but substituting ethyl isocyanate for methyl isocyanate, there was prepared 1-ethyl-3-(m-formylphenyl) urea oxime having a melting point of 172°–172.5° C.

Anal. Calc'd. for $C_{10}H_{13}N_3O_2$: C, 57.96; H, 6.32; N, 20.28. Found: C, 58.20; H, 6.64; N, 20.28.

Preparation 5: Preparation of 1-allyl-3-(m-formylphenyl) urea oxime

Following the procedure of Preparation 3, but substituting allyl isocyanate for methyl isocyanate, there was prepared 1-allyl-3-(m-formylphenyl) urea oxime having a melting point of 161.5°–162° C.

Anal. Calc'd. for $C_{11}H_{13}N_3O_2$: C, 60.26; H, 5.98; N, 19.15. Found: C, 60.06; H, 6.02; N, 19.37.

Preparation 6: 1-n-Butyl-3-(m-formylpheny) urea oxime

Following the procedure of Preparation 3, but substituting n-butyl isocyanate for methyl isocyanate there was prepared 1-n-butyl-3-(m-formylphenyl) urea oxime having a melting point at 140°–140.5° C.

Anal. Calc'd. for $C_{12}H_{17}N_3O_2$: C, 61.25; H, 7.28; N, 17.86. Found: C, 61.23; H, 7.26; N, 17.45.

Preparation 7

In the manner given in the preceding examples (3–6) other substituted urea oximes can be prepared by treating m-amino benzaldehyde oxime with other isocyanates. Representative compounds thus prepared include:

1-(2-butyl)-3-(m-formylphenyl)urea oxime,
1-isobutyl-3-(m-formylphenyl)urea oxime,
1-n-pentyl-3-(m-formylphenyl)urea oxime,
1-isopentyl-3-(m-formylphenyl)urea oxime,
1-(2-butenyl)-3-(m-formylphenyl)urea oxime,
1-(3-butenyl)-3-(m-formylphenyl)urea oxime,
1-(2-hexenyl)-3-(m-formylphenyl)urea oxime,
1-(4-hexenyl)-3-(m-formylphenyl)urea oxime,
1-(3-heptenyl)-3-(m-formylphenyl)urea oxime,
1-(5-heptenyl)-3-(m-formylphenyl)urea oxime,
1-(4-octenyl)-3-(m-formylphenyl)urea oxime,
1-phenyl-3-(m-formylphenyl)urea oxime,
1-(p-bromophenyl)-3-m(-formylphenyl)urea oxime,
1-(m-chlorophenyl)-3-(m-formylphenyl)urea oxime,
1-(m-nitrophenyl)-3-(m-formylphenyl)urea oxime,
1-(p-tolyl)-3-(m-formylphenyl)urea oxime,
1-benzyl-3-(m-formylphenyl)urea oxime,
1-(p-nitrobenzyl)-3-(m-formylphenyl)urea oxime,
1-(2,4-dimethylbenzyl)-3-(m-formylphenyl)urea oxime,
1-($\alpha$-naphthyl)-3-(m-formylphenyl)urea oxime, and
1-($\beta$-naphthyl)-3-(m-formylphenyl)urea oxime.

Preparation 8: Preparation of 1-ethyl-3-(m-formylphenyl-2-thio urea oxime

Following the procedure of Preparation 3, but substituting ethyl isothiocyanate for methyl isocyanate, there was prepared 1-ethyl-3-(m-formylphenyl)-2-thio urea oxime having a melting point at 147.5°–149° C.

Anal. Calc'd. for $C_{10}H_{13}N_3OS$ (223.23): C, 53.80: H, 5.87; N, 18.83. Found: C, 54.03; H, 5.88; N, 18.64.

Preparation 9

In the manner given in Preparation 3, other substituted thiourea oximes can be prepared by treating m-aminobenzaldehyde oxime with various isothiocyanates. Representative compounds thus prepared include:

1-butyl-3-(m-formylphenyl)-2-thio urea oxime,
1-(sec-butyl)-3-(m-formylphenyl)-2-thio urea oxime,
1-propyl-3-m(formylphenyl)-2-thio urea oxime,
1-pentyl-3-(m-formylphenyl)-2-thio urea oxime,
1-(3-methylbutyl)-3-(m-formylphenyl)-2-thio urea oxime,
1-cyclohexyl-3-(m-formylphenyl)-2-thio urea oxime,
1-phenyl-3-(m-formylphenyl)-2-thio urea oxime,
1-(4-bromophenyl)-3-(m-formylphenyl)-2-thio urea oxime,
1-(3-nitrophenyl)-3-(m-formylphenyl)-2-thio urea oxime,
1-(4-propylphenyl)-3-(m-formylphenyl)-2-thio urea oxime,
1-methyl-3-(m-formylphenyl)-2-thio urea oxime,
1-allyl-3-(m-formylphenyl)-2-thio urea oxime,
1-(2-butenyl)-3-(m-formylphenyl)-2-thio urea oxime,
1-(3-pentenyl)-3(m-formylphenyl)-2-thio urea oxime,
1-(4-hexenyl)-3-(m-formylphenyl)-2-thio urea oxime, 1-benzyl-3-(m-formylphenyl)-2-thio urea oxime,
1-(1-naphthyl)-3-(m-formylphenyl)-2-thio urea oxime, and
1-(2-naphthyl)-3-(m-formylphenyl)-2-thio urea oxime.

Preparation 10: 3-(m-Formylphenyl)-1,1-dimethylurea oxime

A solution of m-amino-benzaldehyde oxime (1.36 g.; 0.01 M) in pyridine (8 ml.) was cooled to +10° C. and treated drop by drop with dimethyl carbamoyl chloride (1.07 g.; 0.01 M) during 10 minutes. The reaction mixture was kept at room temperature for 5 hours, poured into water (40 ml.), the aqueous layer was extracted with ethyl acetate (3 × 20 ml.), the combined ethyl acetate layer was washed with N hydrochloric acid (3 × 15 ml.). water (3 × 15 ml.) and dried (sodium sulphate). The solvent was removed under reduced pressure and the solid obtained was recrystallized from acetone/hexane. M.P. 165°–166° C.

Anal. Calc'd. for $C_{10}H_{13}N_3O_2$ (207.23): C, 57.96; H, 6.32; N, 20.28. Found: C, 57.92; H, 6.46; N, 20.03.

Preparation 11

Following the procedure of Preparation 10, other urea oximes can be prepared by treating m-aminobenzaldehyde oxime with other N,N-disubstituted carbamoyl chlorides. Representative compounds thus obtained, include:
 3-(m-formylphenyl)-1,1-diethylurea oxime,
 3-(m-formylphenyl)-1,1-dibutylurea oxime,
 3-(m-formylphenyl)-1-methyl-1-ethylurea oxime,
 3-(m-formylphenyl)-1-pentyl-1-propylurea oxime,
 3-(m-formylphenyl)-1,1-dihexylurea oxime,
 3-(m-formylphenyl)-1,1-dicyclohexylurea oxime,
 3-(m-formylphenyl)-1,1-dioctylurea oxime,
 3-(m-formylphenyl)-1,1-diphenylurea oxime, and
 3-(m-formylphenyl)-1-phenyl-1-methylurea oxime.

Preparation 12

Following the procedure of Preparation 10, N,N-disubstituted thiourea oximes can be prepared by treating m-aminobenzaldehyde oxime with N,N-disubstituted thiocarbamoyl chlorides. Representative compounds thus obtained, include:
 3-(formylphenyl)-1,1-dimethyl-2-thiourea oxime,
 3-(formylphenyl)-1,1-diethyl-2-thiourea oxime,
 3-(formylphenyl)-1,1-dihexyl-2-thiourea oxime,
 3-(formylphenyl)-1-methyl-1-ethyl-2-thiourea oxime,
 3-(formylphenyl)-1-propyl-1-ethyl-2-thiourea oxime,
 3-(formylphenyl)-1-butyl-1-hexyl-2-thiourea oxime,
 3-(formylphenyl)-1,1-dicyclohexyl-2-thiourea oxime,
 3-(formylphenyl)-1,1-diphenyl-2-thiourea oxime,
 3-(formylphenyl)-1-methyl-1-phenyl-2-thiourea oxime, and
 3-(formylphenyl)-1,1-dibenzyl-2-thiourea oxime.

Preparation 13: Methyl m-formylcarbanilate oxime

To a solution of m-aminobenzaldehyde oxime (6.8 g.; 0.05 M) in ethyl acetate (35 ml.), magnesium oxide (1.7 g.; 0.0425 M) and water (25 ml.) was added. The vigorously stirred solution was kept between 10°–15° C. and treated with methyl chloroformate (4.7 g.; 0.05 M) at such a rate as to keep the internal temperature between 10°–15° C. The reaction mixture was stirred for 30 minutes at room temperature, acidified with N hydrochloric acid, the ethyl acetate layer decanted, and the aqueous layer extracted with ethyl acetate (1 × 15 ml.) The combined ethyl acetate layers were washed with water (2 × 10 ml.), dried (sodium sulphate) and evaporated under reduced pressure. The resultant oil was crystallized from ether/hexane or chloroform/hexane M.P. 105°–106° C.

Anal. Calc'd. for $C_9H_{10}N_2O_3$ (194.19): C, 55.66; H, 5.19; N, 14.43. Found: C, 55.56; H, 5.10; N, 14.62.

Preparation 14: n-Butyl-m-formylcarbanilate oxime

Following the procedure of Preparation 13, but substituted n-butyl chloroformate for methyl chloroformate, there was obtained n-butyl-m-formylcarbanilate oxime which after recrystallization from ether/hexane or chloroform/hexane had a melting point at 99°–100° C.

Anal. Calc'd. for $C_{12}H_{16}N_2O_3$ (236.26): C, 61.00; H, 6.83; N, 11.86. Found: C, 60.87; H, 6.88; N, 11.83.

Preparation 15: Benzyl-m-formylcarbanilate oxime

Following the procedure of Preparation 13, but substituting benzyl chloroformate for methyl chloroformate, there was obtained benzyl-m-formyl carbanilate oxime which after recrystallization from ether hexane or chloroform/hexane had a melting point at 107°–108° C.

Anal. Calc'd. for $C_{15}H_{14}N_2O_3$ (270.28): C, 66.65; H, 5.22; N, 10.37. Found: C, 66.51; H, 5.41; N, 10.26.

Preparation 16: 2,2,2-Trichloroethyl-m-formylcarbanilate oxime

Following the procedure of Preparation 13, but substituting 2,2,2-trichloroethyl chloroformate for methyl chloroformate, there was obtained 2,2,2-trichloroethyl-m-formylcarbanilate oxime, which had a melting point at 154°–155°C.

Anal. Calc'd. for $C_{10}H_9Cl_3N_2O_3$ (311.56): C, 38.54; H, 2.91; N, 8.99; Cl, 34.14. Found: C, 38.35; H, 3.32; N, 8.81; Cl, 34.05.

Preparation 17

Following the procedure of Preparation 13, but substituting ethyl chloroformate, propyl chloroformate, isobutyl chloroformate, n-pentyl chloroformate, neopentyl chloroformate, hexyl chloroformate, heptyl chloroformate, octyl chloroformate, cyclohexyl chloroformate, p-bromobenzyl chloroformate for methyl chloroformate, there are prepared the ethyl, propyl, isobutyl, n-pentyl, neopentyl, hexyl, heptyl, octyl, cyclohexyl and p-bromobenzyl, m-formyl carbanilate oxime.

Preparation 18: 1-Methyl-3-(m-formylphenyl)urea 0-(2,4-dinitrophenyl) oxime

A solution of 1-methyl-3-(m-formylphenyl)urea oxime (1.93 g.; 0.01 M) in N sodium hydroxide (10 ml.; 0.01 M) was treated dropwise with 2,4-dinitro fluorobenzene (1.86 g.; 0.01 M) with vigorous stirring. When precipitation appeared to be complete, N sodium hydroxide (10 ml.; 0.01 M) was added, followed by 2,4-dinitro fluorobenzene (1.868; 0.01M) and the mixture further stirred for 2 hours. The precipitate was filtered, washed with N sodium hydroxide (3 × 30 ml.) water (3 × 30 ml.), dried and recrystallized from acetone/hexane, M.P. 192°–193° C.

Anal, Calc'd. for $C_{15}H_{13}N_5O_6$ (359.29): C, 50.14; H, 3.65; N, 19.49. Found: C, 50.34; H, 3.71; N, 19.22.

Preparation 19

Following the procedure of Preparation 18, but substituting:

1-ethyl-3-(m-formylphenyl)urea oxime,
1-allyl-3-(m-formylphenyl)urea oxime,
1-butyl-3-(m-formylphenyl)urea oxime,
1-(2-butyl)-3-(m-formylphenyl)urea oxime,
1-isobutyl-3-(m-formylphenyl)urea oxime,
1-n-pentyl-3-(m-formylphenyl)urea oxime,
1-isopentyl-3-(m-formylphenyl)urea oxime,
1-neopentyl-3-(m-formylphenyl)urea oxime,
1-(2-butenyl)-3-(m-formylphenyl)urea oxime,
1-(3-butenyl)-3-(m-formylphenyl)urea oxime,
1-(2-hexenyl)-3-(m-formylphenyl)urea oxime,
1-(4-hexenyl)-3-(m-formylphenyl)urea oxime,
1-(3-heptenyl)-3-(m-formylphenyl)urea oxime,
1-(5-heptenyl)-3-(m-formylphenyl)urea oxime,
1-(4-octenyl)-3-(m-formylphenyl)urea oxime,
1-phenyl-3-(m-formylphenyl)urea oxime,
1-(p-bromophenyl)-3-(m-formylphenyl)urea oxime,
1-(m-chlorophenyl)-3-(m-formylphenyl)urea oxime,
1-(m-nitrophenyl)-3-(m-formylphenyl)urea oxime,
1-(p-tolyl)-3-(m-formylphenyl)urea oxime,
1-benzyl-3-(m-formylphenyl)urea oxime,
1-(p-nitrobenzyl)-3-(m-formylphenyl)urea oxime,
1-(2,4-dimethylbenzyl)-3-(m-formylphenyl)urea oxime,
1-(α-naphthyl)-3-(m-formylphenyl)urea oxime,
1-(β-naphthyl)-3-(m-formylphenyl)urea oxime, and the like, for 1-methyl-3-(m-formylphenyl)urea oxime, there were prepared;

1-ethyl-3-(m-formylphenyl)urea 0-(2,4-dinitrophenyl) oxime,
1-allyl-3(m-formylphenyl)urea 0-(2,4-dinitrophenyl) oxime,
1-butyl-3-(m-formylphenyl)urea 0-(2,4-dinitrophenyl) oxime,
1-(2-butyl)-3-(m-formylphenyl)urea 0-(2,4-dinitrophenyl) oxime,
1-isobutyl-3-(m-formylphenyl)urea 0-(2,4-dinitorphenyl) oxime,
1-n-pentyl-3-(m-formylphenyl)urea 0-(2,4-dinitrophenyl) oxime,
1-isopentyl-3-(m-formylphenyl)urea 0-(2,4-dinitrophenyl) oxime,
1-neopentyl-3-(m-formylphenyl)urea 0-(2,4-dinitrophenyl) oxime,
1-(2-butenyl)-3-(m-formylphenyl)urea 0-(2,4-dinitrophenyl) oxime,
1-(3-butenyl)-3-(m-formylphenyl)urea 0-(2,4-dinitrophenyl) oxime,
1-(2-hexenyl)-3-(m-formylphenyl)urea 0-(2,4-dinitrophenyl) oxime,
1-(4-hexenyl)-3-(m-formylphenyl)urea 0-(2,4-dinitrophenyl) oxime,
1-(3-heptenyl)-3-(m-formylphenyl)urea 0-(2,4-dinitrophenyl) oxime,
1-(5-heptenyl)-3-(m-formylphenyl)urea 0-(2,4-dinitrophenyl) oxime,
1-(4-octenyl)-3-(m-formylphenyl)urea 0-(2,4-dinitrophenyl) oxime,
1-phenyl-3-(m-formylphenyl)urea 0-(2,4-dinitrophenyl) oxime,
1-(p-bromophenyl)-3-(m-formylphenyl)urea 0-(2,4dinitrophenyl) oxime,
1-(m-chlorophenyl)-3-(m-formylphenyl)urea 0-(2,4-dinitrophenyl) oxime,
1-(m-nitrophenyl)-3-(m-formylphenyl)urea 0-(2,4-dinitrophenyl) oxime,
1-(p-tolyl)-3-(m-formylphenyl)urea 0-(2,4-dinitrophenyl) oxime,
1-benzyl-3-(m-formylphenyl)urea 0-(2,4-dinitrophenyl) oxime,
1-(p-nitrobenzyl)-3-(m-formylphenyl)urea 0-(2,4-dinitrophenyl) oxime,
1-(2,4-dimethylbenzyl)-3-(m-formylphenyl)urea 0-(2,4-dinitrophenyl) oxime,
1-(α-naphthyl)-3-(m-formylphenyl)urea 0-(2,4-dinitrophenyl) oxime,
1-(β-naphthyl)-3-(m-formylphenyl)urea 0-(2,4-dinitrophenyl) oxime,
and the like.

Preparation 20

Following the procedure of Preparation 18, but substituting:

1-ethyl-3-(m-formylphenyl)-2-thiourea oxime,
1-butyl-3-(m-formylphenyl)-2-thiourea oxime,
1-(sec-butyl)-3-(m-formylphenyl)-2-thiourea oxime,
1-propyl-3-(m-formylphenyl)-2-thiourea oxime,
1-pentyl-3-(m-formylphenyl)-2-thiourea oxime,
1-(3-methylbutyl)-3-(m-formylphenyl)-2-thiourea oxime,
1-cyclohexyl-3-(m-formylphenyl)-2-thiourea oxime,
1-phenyl-3-(m-formylphenyl)-2-thiourea oxime,
1-(4-bromophenyl)-3-(m-formylphenyl)-2-thiourea oxime,
1-(3-nitrophenyl)-3-(m-formylphenyl)-2-thiourea oxime,
1-(4-propylphenyl)-3-(m-formylphenyl)-2-thiourea oxime,
1-methyl-3-(m-formylphenyl)-2-thiourea oxime,
1-allyl-3-(m-formylphenyl)-2-thiourea oxime,
1-(2-butenyl)-3-(m-formylphenyl)-2-thiourea oxime,
1-(3-pentenyl)-3-(m-formylphenyl)-2-thiourea oxime,
1-(4-hexenyl)-3-(m-formylphenyl)-2-thiourea oxime,
1-benzyl-3-(m-formylphenyl)-2-thiourea oxime,
1-(1-naphthyl)-3-(m-formylphenyl)-2-thiourea oxime,
1-(2-naphthyl)-3-(m-formylphenyl)-2-thiourea oxime, and the like for 1-(m-formylphenyl)-3-methyl-2-thiourea oxime, there are prepared:

1-ethyl-3-(m-formylphenyl)-2-thiourea 0-(2,4-dinitrophenyl) oxime,
1-butyl-3-(m-formylphenyl)-2-thiourea 0-(2,4-dinitrophenyl) oxime,
1-(sec-butyl)-3-(m-formylphenyl)-2-thiouea 0-(2,4-dinitrophenyl) oxime,
1-propyl-3-(m-formylphenyl)-2-thiourea 0-(2,4-dinitrophenyl) oxime,
1-pentyl-3-(m-formylphenyl)-2-thiourea 0-(2,4-dinitrophenyl) oxime,
1-(3-methylbutyl)-3-(m-formylphenyl)-2-thiourea 0-(2,4-dinitrophenyl) oxime,
1-cyclohexyl-3-(m-formylphenyl)-2-thiourea 0-(2.4-dinitrophenyl) oxime,
1-phenyl-3-(m-formylphenyl)-2-thiourea 0-(2,4-dinitrophenyl) oxime, 1-(4-bromophenyl)-3-(m-formylphenyl)-2-thiourea 0-(2,4-dinitrophenyl) oxime,
1-(3-nitrophenyl)-3-(m-formylphenyl)-2-thiourea 0-(2,4-dinitrophenyl) oxime,
1-(4-propylphenyl)-3-(m-formylphenyl)-2-thiourea 0-(2,4-dinitrophenyl) oxime,
1-methyl-3-(m-formylphenyl)-2-thiourea 0-(2,4-dinitrophenyl) oxime,
1-allyl-3-(m-formylphenyl)-2-thiourea 0-(2,4-dinitrophenyl) oxime,
1-(2-butenyl)-3-(m-formylphenyl)-2-thiourea 0-(2,4-dinitrophenyl) oxime,
1-(3-pentenyl)-3-(m-formylphenyl)-2-thiourea 0-(2,4-dinitrophenyl) oxime,
1-(4-hexenyl)-3-(m-formylphenyl)-2-thiourea 0-(2,4-dinitrophenyl) oxime,
1-benzyl-3-(m-formylphenyl)-2-thiourea 0-(2,4-dinitrophenyl) oxime,
1-(1-naphthyl)-3-(m-formylphenyl)-2-thiourea 0-(2,4-dinitrophenyl) oxime, and
1-(2-naphthyl)-3-(m-formylphenyl)-2-thiourea 0-(2,4-dinitrophenyl) oxime.

Preparation 21: 3-(m-Formylphenyl)-1,1-dimethylurea 0-(p-nitrophenyl) oxime

A solution of m-aminobenzaldehyde-0-(p-nitrophenyl) oxime (5 g.; 0.0194 M) in pyridine (75 ml.) was cooled to 10° C. and treated dropwise with dimethyl carbamoyl chloride (8.8 g.; 0.082 M). The mixture was kept at room temperature for 2.5 hours, poured into ice water (800 ml.), the precipitate filtered, washed with water (100 ml.), dried, and recrystallized from chloroform. M.P. 189°–190° C.

Anal. Calc'd. for $C_{10}H_{10}N_4O_4$ (328.82): C, 58.53; H, 4.91; N, 17.07. Found: C, 58.48; H, 5.02; N, 17.39.

Preparation 22

Following the procedure of Preparation 21 but substituting diethyl carbamoyl chloride, n-methyl-n-ethyl carbamoyl chloride, n-pentyl-n-propyl carbamoyl chloride, dihexyl carbamoyl chloride, dicyclohexyl carbamoyl chloride, dioctyl carbamoyl chloride, diphenyl carbamoyl chloride, n-methyl-n-phenyl carbamoyl chloride and the like for dimethyl carbamoyl chloride, there was prepared;

3-(m-formylphenyl)-1,1-diethylurea 0-(p-nitrophenyl) oxime,
3-(m-formylphenyl)-1-methyl-1-ethyl urea 0-(p-nitrophenyl) oxime,
3-(m-formylphenyl)-1-pentyl-1-propyl urea 0-(p-nitrophenyl) oxime,
3-(m-formylphenyl)-1,1-dihexyl urea 0-(p-nitrophenyl) oxime,
3-(m-formylphenyl)-1,1-dicyclohexyl urea 0-(p-nitrophenyl) oxime,
3-(m-formylphenyl)-1,1-dioctyl urea 0-(p-nitrophenyl) oxime,
3-(m-formylphenyl)-1,1-diphenyl urea 0-(p-nitrophenyl) oxime,
3-(m-formylphenyl)-1-phenyl-1-methyl urea 0-(p-nitrophenyl) oxime, and the like.

Preparation 23

Following the procedure of Preparation 21, but substituting dimethyl thiocarbamoyl chloride, diethyl thiocarbamoyl chloride, dihexyl thiocarbamoyl chloride, n-methyl-n-ethyl thiocarbamoyl chloride, n-ethyl-n-propyl thiocarbamoyl chloride, n-butyl-n-hexyl thiocarbamoyl chloride, dicyclohexyl thiocarbamoyl chloride, diphenyl thiocarbamoyl chloride, n-methyl-n-phenyl thiocarbamoyl chloride, dibenzyl thiocarbamoyl chloride and the like, for dimethyl carbamoyl chloride, there are prepared;

3-(m-formylphenyl)-1,1-dimethyl-2-thiourea 0-(p-nitrophenyl) oxime,
3-(m-formylphenyl)-1,1-diethyl-2-thiourea 0-(p-nitrophenyl) oxime,
3-(m-formylphenyl)-1,1-dihexyl-2-thiourea 0-(p-nitrophenyl) oxime,
3-(m-formylphenyl)-1-methyl-1-ethyl-2-thiourea 0-(p-nitrophenyl) oxime,
3-(m-formylphenyl)-1-propyl-1-ethyl-2-thiourea 0-(p-nitrophenyl) oxime,
3-(m-formylphenyl)-1-butyl-1-hexyl-2-thiourea 0-(p-nitrophenyl) oxime,
3-(m-formylphenyl)-1,1-dicyclohexyl-2-thiourea 0-(p-nitrophenyl) oxime,
3-(m-formylphenyl)-1,1-diphenyl-2-thiourea 0-(p-nitrophenyl) oxime,
3-(m-formylphenyl)-1-methyl-1-phenyl-2-thiourea 0-(p-nitrophenyl) oxime,
3-(m-formylphenyl)-1,1-dibenzyl-2-thiourea 0-(p-nitrophenyl) oxime, and the like.

Preparation 24: Methyl m-formylcarbanilate 0-(p-nitrophenyl oxime

To a vigorously stirred suspension of m-aminobenzaldehyde-0-(p-nitrophenyl)oxime (5.15 g.; 0.02 M) in ethyl acetate (80 ml.), a suspension of magnesium oxide (1.0 g.; 0.025 M) in water (22 ml.) was added. The reaction mixture was cooled to 10° C. and methyl chloroformate (2.1 g.; 0.022 M) was added at such a rate as to keep the internal temperature between 10° and 15° C. and then further stirred at room temperature for 2 hours. The mixture was acidified with N hydrochloric acid and filtered. The filtrate was extracted with ethyl acetate (3 × 25 ml.), the combined ethyl acetate layers washed with water (3 × 15 ml.), dried, and evaporated under reduced pressure. The solid thus obtained was combined with the solid filtered off after acidification and recrystallized from methylene chloride/hexane. M.P. 173°–174° C.

Anal. Calc'd. for $C_{15}H_{13}N_3O_5$ (315.28): C, 57.14; H, 4.16: N, 13.33. Found: C, 57.25; H, 4.24; N, 13.19.

Preparation 25: 2,2,2-Trichloroethyl m-formyl carbanilate 0-(p-nitrophenyl)oxime Following the procedure of Preparation 24, but substituting 2,2,2-trichloroethyl chloroformate for methyl chloroformate there was prepared 1,1,1-trichloromethyl m-formyl carbanilate 0-(p-nitrophenyl) oxime having a melting point of 140°–141° C.

Anal. Calc'd. for $C_{10}H_{12}Cl_3N_3O_5$ (432.65): C, 44.41; H, 2.79; N, 9.71; Cl, 24.58. Found: C, 44.76, H, 3.04; N, 9.40; Cl, 24.31.

Preparation 26: Benzyl m-formylcarbanilate 0-(p-nitrophenyl) oxime

Following the procedure of Preparation 24, but substituting benzyl chloroformate for methyl chloroformate, there was prepared benzyl m-formyl carbanilate-0-(p-nitrophenyl) oxime having a melting point of 150°–151° C.

Anal. Calc'd. for $C_{21}H_{17}N_3O_5$ (391.37): C, 64.44; H, 4.38; N, 10.74. Found: C, 64.73; H, 4.61; N, 11.00.

Preparation 27

Following the procedure of Preparation 24 but substituting ethyl chloroformate, propyl chloroformate, isobutylchloroformate, hexyl chloroformate, pentyl chloroformate, neopentyl chloroformate, heptyl chloroformate, octyl chloroformate, cyclohexyl chloroformate, p-bromophenyl chloroformate for methyl chloroformate there were prepared:

ethyl m-formylcarbanilate 0-(p-nitrophenyl) oxime,
propyl m-formylcarbanilate 0-(p-nitrophenyl) oxime,
isobutyl m-formylcarbanilate 0-(p-nitrophenyl) oxime,
hexyl m-formylcarbanilate 0-(p-nitrophenyl) oxime,
pentyl m-formylcarbanilate 0-(p-nitrophenyl) oxime,
neopentyl m-formylcarbanilate 0-(p-nitrophenyl) oxime,
heptyl m-formylcarbanilate 0-(p-nitrophenyl) oxime,
octyl m-formylcarbanilate 0-(p-nitrophenyl) oxime,
cyclohexyl m-formylcarbanilate 0-(p-nitrophenyl) oxime,
(p-bromophenyl)-m-formylcarbanilate 0-(p-nitrophenyl) oxime.

For purposes according to the method of this invention, benzoldoxime compounds (compound according to Formula (1) are formulated in herbicidal compositions. Such compositions in accordance with the invention include solutions, emulsions, suspensions, dispersible powders, emulsifiable concentrates, granular formulations, and dusts. All of these compositions comprise the compound in dispersed or readily dispersible form and a dispersible carrier, with or without adjuvants. In general, selective inhibition of undesired weed species in the presence of desired plants, e.g., field agronomic or horticultural crops, or in turf is obtained by employing a phytonomic carrier, that is to say, a carrier which can be applied to plants without phytotoxicity or other adverse effects. On the other hand, when general herbicidal activity is desired a phytotoxic carrier, for example, high-boiling petroleum fractions such as kerosene can be used.

The efficacy of the m-aminobenzaldoxime derivatives of this invention as herbicides is of high order, and the compounds can be applied at relatively low rates per acre for controlling growth of weed plants, e.g., germinating weed seeds and weed seedlings. Illustratively, the compounds;

3-(m-formylphenyl)-1-methylurea oxime,
3-(m-formylphenyl)-1,1-dimethylurea oxime,
3-(m-formylphenyl)-1ethylurea oxime,
3-(m-formylphenyl)-1-allylurea oxime,
3-(m-formylphenyl)-1-butylurea oxime,
3-(m-formylphenyl)-1-ethylurea-2-thio oxime,
3-(m-formylphenyl)-1-methylurea-0-(2,4-dinitrophenyl) oxime,
3-(m-formylphenyl)-1,1-dimethylurea-0-p-nitropheny) oxime,
methyl (m-formyl) carbanilate oxime,
2,2,2-trichloroethyl-(m-formyl)carbanilate oxime,
butyl (m-formyl)carbanilate oxime,
benzyl (m-formyl)carbanilate oxime,
methyl (m-formyl)carbanilate-0-(p-nitrophenyl) oxime,
2,2,2-trichloroethyl(m-formyl) carbanilate-0-(p-nitrophenyl) oxime,
benzyl (m-formyl)carbanilate-0-(p-nitrophenyl) oxime, gave complete or substantially complete suppression of buckhorn plantain (*Plantago lanceolata* L.), common purslane (*Portulaca oleracea* L.), yellow foxtail (*Setaria flauca* L.), bindweed (*Convolvulus arvensis*), lambsquarters (*Chonopodium album*), and red sorrel (sheep sorrel) (*Rumex acetosella* L.), when applied at rates of about 6 lbs. per acre. Rates of application of about 0.1 to about 15 lbs. per acre are efficacious under usual conditions, depending upon the particular circumstances such as type of soil, amount of rainfall or irrigation, and the most prevalent kinds of weeds. At higher rates of application, e.g., at 20 to 50 lbs. per acre the compound acts as a soil sterilant.

Illustratively, excellent control of weeds in rice fields has been obtained, without significant damage to the rice plants, using concentrations of m-aminobenzaldoxime derivatives ranging from about 1000 ppm (parts per million) to about 5000 ppm applied at the rates of about 1 lb. to about 3.0 lbs. per acre. In general, a desired rate of application can be achieved by distributing, over the area to be treated, an aqueous composition in accordance with the invention, containing from about 700 ppm to about 30,000 ppm of active ingredient. It will be understood, of course, that a choice of concentration of active ingredient depends upon the method of application as well as the type of composition and the degree of herbicidal control desired. In general, concentration is not critical within the range indicated since an effective quantity of active ingredient can be applied to a given area by applying greater quantities of a low concentration than of a higher concentration. The concentration of active ingredient in the dispersible powder and emulsifiable concentrates from which the aqueous compositions are prepared can be as high as 99.5% by weight. The concentration of active ingredient in the dust and granular formulations of the invention can vary from about 0.25% to about 80% or more, but advantageously is of the order of 0.50% to 20%.

The granular formulations of this invention are prepared with about 0.25% to about 80%, preferably 0.50% to 20% by weight, of active ingredient and a granular carrier, for example, vermiculite, pyrophyllite, or attapulgite. The active ingredient can be dissolved in a volatile solvent such as methylene chloride, acetone, and the like, and sprayed on the granular carrier as it is mixed and tumbled. The granules are then dried. The granular carrier can range in particle size from about 10 to about 60 mesh, preferably about 30 to 60 mesh.

The herbicidal dust compositions of the invention are prepared by intimate admixture of from about 0.25% to about 80% by weight, preferably 0.50% to 20% of the active ingredient with a solid pulverulent carrier which maintains the composition in a dry, free-flowing condition. The herbicidal dusts of the invention can be prepared by admixing the compound with a solid diluent and then milling. Preferably, however, the active ingredient is dissolved in a volatile organic solvent, of the kinds indicated above, and then sprayed on the solid carrier so as to assure thorough distribution. The mixture is then dried and milled to the desired size, e.g., less than about 60 microns.

Solid carriers that can be used in the dust compositions of the invention include the natural clays such as China clay and bentonite, minerals in the natural state such as talc, pyrophyllite, quartz, diatomaceous earth, fuller's earth, chalk, and rock phosphate, and the chemically modified minerals such as washed bentonite, precipitated calcium phosphate, precipitated calcium carbonate, precipitated calcium silicate, and colloidal silica. The solid diluents which can be employed in the composition also include solid, compounded fertilizers. Such solid compositions can be applied to vegetation in the form of dusts by the use of conventional equipment.

A preferred composition, in accordance with the invention, is a dispersible powder which is prepared by incorporating a surfactant in a dust composition prepared as described above. Such a dispersible powder can be dispersed in water to any desired concentration and applied to vegetation by conventional spray equipment. Conveniently, the dispersible powders are formulated with higher concentrations of active ingredient than the dust compositions, for example, up to about 90%, preferably about 10% to 80%. Surfactants useful in preparing such dispersible powder compositions include alkyl sulfates and sulfonates, alkyl aryl sulfonates, sulfosuccinate esters, polyoxyethylene sulfates, polyoxyethylene-sorbitan monolaurate, alkyl aryl polyether sulfates, alkyl aryl polyether alcohols, alkyl naphthalene sulfonates, alkyl quaternary ammonium salts, sulfated fatty acids and esters, sulfated fatty acid amides, glycerol mannitan laurate, polyalkylether condensates of fatty acids, lignin sulfonates, and the like. A preferred class of surfactants includes blends of sulfonated oils and polyalcohol carboxylic acid esters (Emcol H-77), blends of polyoxyethylene ethers and oil-soluble sulfonates (Emcol H-400), blends of alkyl aryl sulfonates and alkylphenoxy polyethoxy ethanols (Tritons X-151, X-161, and X-171), e.g., about equal parts of sodium kerylbenzene sulfonate and isooctylphenoxy polyethoxy ethanol containing about 12 ethoxy groups, and blends of calcium alkyl aryl sulfonates and polyethoxylated vegetable oils (Agrimul $N_4S$). It will be understood, of course, that the sulfate and sulfonate surfactants suggested above will preferably be used in the form of their soluble salts, for example, their sodium salts. All of these surfactants are capable of reducing the surface tension of water to less than about 40 dynes per centimeter in concentrations of about 1% or less. The dispersible powder compositions can be formulated with a mixture of surfactants of the types indicated if desired.

A suitable dispersible powder formulation is obtained by blending and milling 235 lbs. of Georgia Clay, 5.5 lbs. of isooctylphenoxy polyethoxy ethanol (Triton X-100) as a wetting agent, 9.5 lbs. of a polymerized sodium salt of substituted benzoid longchain sulfonic acid (Daxad 27) as dispersing agent, and 250 lbs. of the active ingredient. The resulting formulation has the following percentage composition (parts herein are by weight unless otherwise specified).

| | | |
|---|---|---|
| Active ingredient | 50 | % |
| Isooctylphenoxy polyethoxy ethanol | 1.1 | % |
| Polymerized sodium salt of substituted benzoid long-chain sulfonic acid | 1.9 | % |
| Georgia Clay | 47 | % |

The formulation, when dispersed in water at the rate of 10 lbs. per 100 gals., gives a spray formulation containing about 0.6% (6000 ppm) active ingredient which can be applied to soil, plant growth media, growing plants, e.g., turf at the rate of 40 gals. per acre to give a total application of active ingredient of 2 lbs. per acre.

The compounds of this invention can be applied to soil, plants, plant growth media, growing plants, e.g., turf in aqueous sprays without a solid carrier. However, since the compounds themselves are relatively insoluble in water they are preferably dissolved in a suitable inert organic solvent carrier. Advantageously, the solvent carrier is immiscible with water so that an emulsion of the solvent carrier in water can be prepared. If, for example, a water-miscible solvent carrier such as acetone is used the solvent carrier will dissolve in the water and any excess according to Formula I will be thrown out of solution. In an emulsion, the solvent phase is dispersed in the water phase and the active ingredient is held in solution in the dispersed phase. In this way, uniform distribution of active ingredient with an aqueous spray can be achieved.

A solvent carrier in which the compounds are highly soluble is desirable so that relatively high concentrations of active ingredient can be obtained. Sometimes, one or more solvent carriers with or without a cosolvent can be used in order to obtain concentrated solutions of the active ingredient, the main consideration being to employ a water-immiscible solvent for the active ingredient that will hold the compound in solution over the range of concentrations useful for preventing germination of undesired seeds and controlling growth of plants.

The emulsifiable concentrates of the invention are prepared by dissolving the active ingredient and a surfactant in a substantially water-immiscible solvent carrier (i.e., a solvent carrier which is soluble in water to the extent of less than 2.5% by volume at temperatures of the order of 20° to 30° C.), for example, cyclohexanone, methyl propyl ketone, summer oils, ethylene dichloride, aromatic hydrocarbons such as benzene, toluene, and xylene, and high-boiling petroleum hydrocarbons such as kerosene, diesel oil, and the like. If desired, a co-solvent such as methyl ethyl ketone, acetone, and the like can be included with the solvent carrier in order to enhance the solubility of the active ingredient. Aqueous emulsions are then prepared by mixing with water to give any desired concentration of active ingredient. The surfactants which can be employed in the aqueous emulsions of the invention are those types noted above. Mixtures of surfactants can be employed if desired.

Advantageously, the concentration of active ingredient in the emulsifiable concentrates can range from about 5% to about 50% by weight, preferably from about 10% to 40%. A concentrate comprising 20% (by weight) of the compound dissolved in a water-immiscible solvent of the kind noted above can be admixed with an aqueous medium in the proportions of 13 ml. of concentrate with 1 gal. of medium to give a mixture containing 700 parts of active ingredient per million parts of liquid carrier. Similarly, 1 qt. of a 20% concentrate mixed with 40 gals. of water provides about 1200 ppm of active ingredient. In the same manner, more concentrated solutions of active ingredient can be prepared.

The concentrate compositions of the invention which are intended for use in the form of aqueous dispersions or emulsions can also comprise a humectant, that is to say, an agent which will delay the drying of the composition in contact with material to which it has been applied. Suitable humectants include solubilized lignins, such as calcium lignosulfonate, and the like.

Further in accordance with this invention, certain formulations of m-aminobenzaldoxime derivatives with oil are particularly efficacious, and herbicidal action of the compound is improved. Any petroleum oil can be used so long as it is not so viscous as to be too difficult to disperse. A non-phytotoxic oil is satisfactory.

Advantageously, a 50% wettable powder of the herbicidal active ingredient is mixed with about 38 gals. water and 2 gals. oil for spray application. Alternatively, about 2. gals. oil and a 50% wettable powder are premixed and then dispersed in about 38 gals. water for spray application. In field tests, oil formulations of the foregoing type have given improved herbicidal action.

The rates of application to soils, plant growth media, growing plants, e.g., turf to be protected from noxious weeds will depend upon the species of vegetation to be controlled, the presence or absence of desirable species, the stage of plant development, the season of year at which treatment is undertaken, and the method and efficiency of application. In general, selective herbicidal activity is obtained when the compounds are applied at the rate of about 1.0 to about 15 lbs. per acre, preferably at the rate of about 1.0 to about 8 lbs. per acre.

The compositions containing m-aminobenzaldoxime derivatives can be applied to soil, plant growth media, growing plants, e.g., turf by conventional methods. For example, an area of soil can be treated prior to or after seeding by spraying wettable powder suspensions, emulsions or solutions from boom-type power sprayers or from hand-operated knapsack sprayers. Dusts can be applied by power dusters, or by hand-operated dusters. Dusts and granular formulations can also be applied at the time of seeding in bands spanning the seeded rows.

Further, the compounds of this invention are efficacious as plant growth regulants when applied at low rates such as 0.1 lb. per acre. For example, significant increases in crop weight were obtained from forage sorghum, red top grass, peanuts, beans, peas and other crops, using compounds of Formula I.

We claim:
1. A compound of the formula:

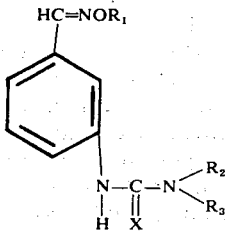

wherein
$R_1$ = nitrophenyl selected from mononitrophenyl and dinitrophenyl.
X = a substituent selected from O and S.
$R_2$ = a substituent selected from H and $R_3$.
$R_3$ = alkyl of from 1 to 8 carbon atoms, inclusive, alkenyl of from 3 to 8 carbon atoms, inclusive, aralkyl hydrocarbon of from 7 to 13 carbon atoms, inclusive and aryl hydrocarbon of from 6 to 10 carbon atoms, inclusive, provided both $R_1$ and $R_2$ are not aryl hydrocarbon at the same time.

2. 1-(m-Formylphenyl)-3-methylurea 0-(2,4-dinitrophenyl) oxime.

3. 3-(m-Formylphenyl)-1,1-dimethylurea 0-(p-nitrophenyl) oxime.

* * * * *